Dec. 14, 1965   R. L. FIELDING   3,223,263
UNDERBODY SPARE TIRE AND WHEEL CARRIER
Filed March 10, 1964   2 Sheets-Sheet 1

INVENTOR.
ROBERT L. FIELDING
BY
Howard L. Johnson
ATTORNEY

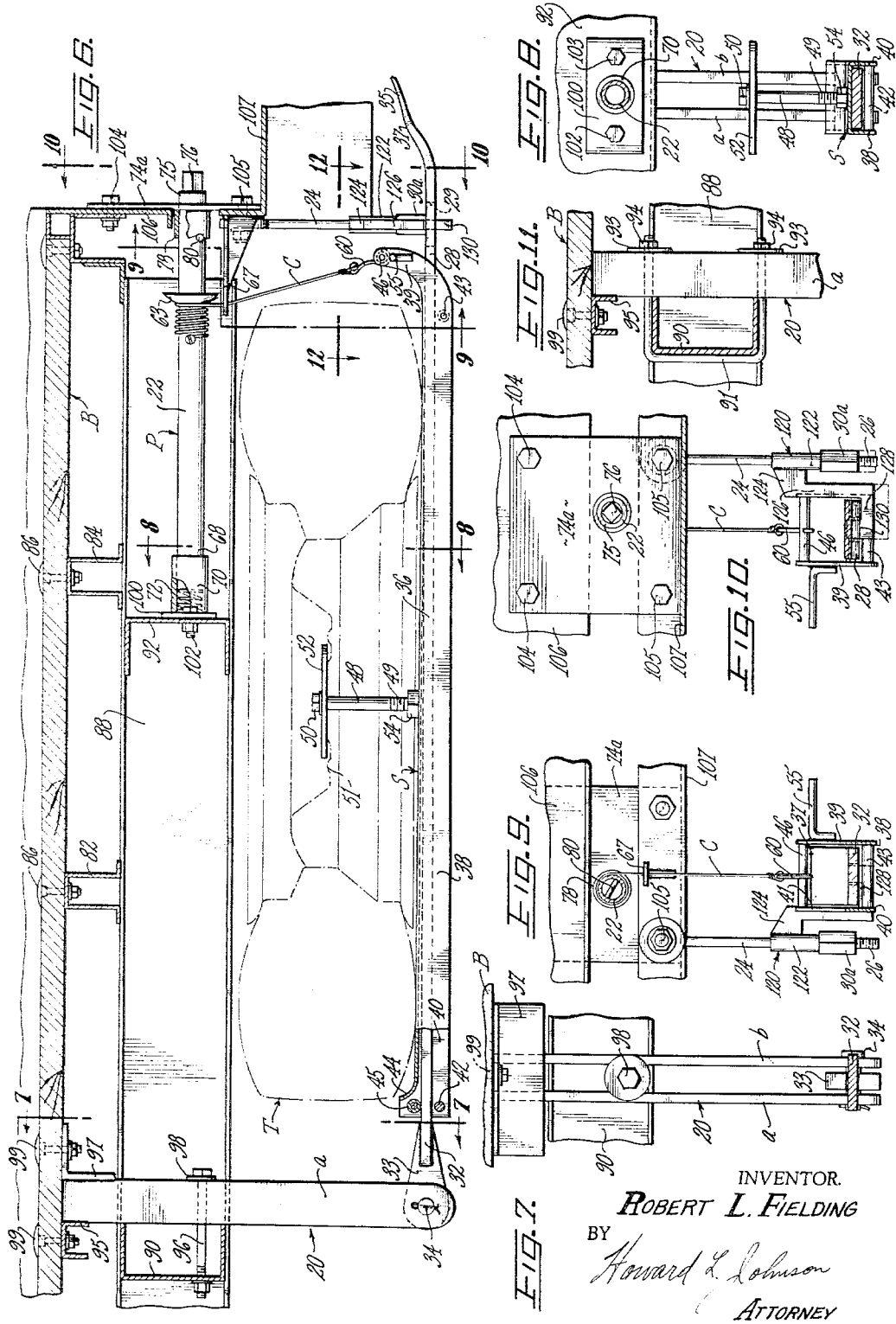

3,223,263
UNDERBODY SPARE TIRE AND
WHEEL CARRIER
Robert L. Fielding, 1455 W. 120th St., Los Angeles, Calif.
Filed Mar. 10, 1964, Ser. No. 347,414
5 Claims. (Cl. 214—454)

This is a continuation-in-part of my application, Serial No. 273,643, filed Apr. 17, 1963.

This invention relates to a carrier assembly particularly adapted to securely retain a spare wheel and/or tire in juxtaposition with the underface of a vehicle body and to enable the same to be easily placed and removed therefrom without requiring the operator to get underneath the vehicle in order to locate and fasten or unfasten the wheel. Thus "pick-up" type trucks which want to avoid using cargo space to store a spare wheel, now bolt it to the undercarriage adjacent the tail gate or outer margin of the vehicle (as long as the clearance between chassis and roadbed is sufficient to permit this). However, such positioning may require the operator to lie on his back beneath the truck, or at best to stoop low and reach far underneath it in order to engage and disengage a wheel or tire from such mounting. When the latter is then freed from its berth, it drops vertically to the ground and has to be pulled out from under the car. When it is to be subsequently replaced, it then has to be first pushed under the car to its approximate location and usually manually lifted and there held in place until completely fastened. While this procedure may be made a little easier by first jacking up the truck or alternately locating it over a work pit, the essential difficulty remains that of manipulating the fairly heavy wheel from beneath the autobody when the operator can only reach such location with difficulty.

Now, by use of the present assembly, such a spare wheel can be easily mounted and demounted underneath the vehicle body by a person standing beyond the perimeter of the body and simply leaning over to place or to pick up the wheel at ground level. Most highway vehicles have a clearance of a foot or so between the underface of the body or chassis and the lowermost point of the rear axle or differential. This raised area behind the rear axle and located between the rear wheels can be used to carry a spare wheel and/or tire without thereby lowering the previous overall clearance which existed between the differential housing and the roadway. Generally such a spare wheel, disposed horizontally, is stored and retrieved from along the rear margin of the vehicle. However, as already noted, the problem is how this can be done easily and without soiling an operator's clothing, especially when such need suddenly arises, for example, on an isolated and muddy or dusty road and in the absence of auxiliary equipment. Thus, house trailers now carry a spare wheel-mounted tire inside the trailer body, or alternately in the towing vehicle, in order to have it more readily accessible. Now, by the present invention, such "remote storage" will no longer be necessary since the spare wheel-mounted tire can be carried adjacent the underbody of the vehicle on which it is intended for use, in a manner making it easy to store and retrieve and without preempting deck space which could otherwise be used for cargo.

In brief, the invention provides simple and highly effective means (1) to mechanically move a spare wheel between an elevated-retracted position of carriage immediately beneath the auto body, and a generally flat or horizontal pick-up position on the ground, which latter "lowered-extended" position is at least partially beyond the periphery of the vehicle so as to make the wheel readily manually accessible, (2) simultaneously to enable the tire or wheel at its ground level position to be fastened to a mounting frame prior to its inward travel, and then to automatically shift the fastened wheel and frame to its upper housed location, and (3) to releasably lock the elevated wheel and frame at their housed position, such lock being readily activated by a person standing at the rear of the vehicle.

Other objects and advantages will become apparent as the description proceeds, having particular reference to the accompanying drawings which illustrate presently preferred embodiments of the invention wherein:

FIGURE 6 is an enlarged view of the vehicle segment of FIGURE 1 showing the slide carrier locked in elevated position with the stored spare wheel and tire shown in phantom;

FIGURES 7, 8, 9, 10 are transverse vertical views taken along the corresponding lines of FIGURE 6;

FIGURE 11 is a construction detail of a modified attachment of the carrier assembly to the vehicle undercarriage;

Figure 1:
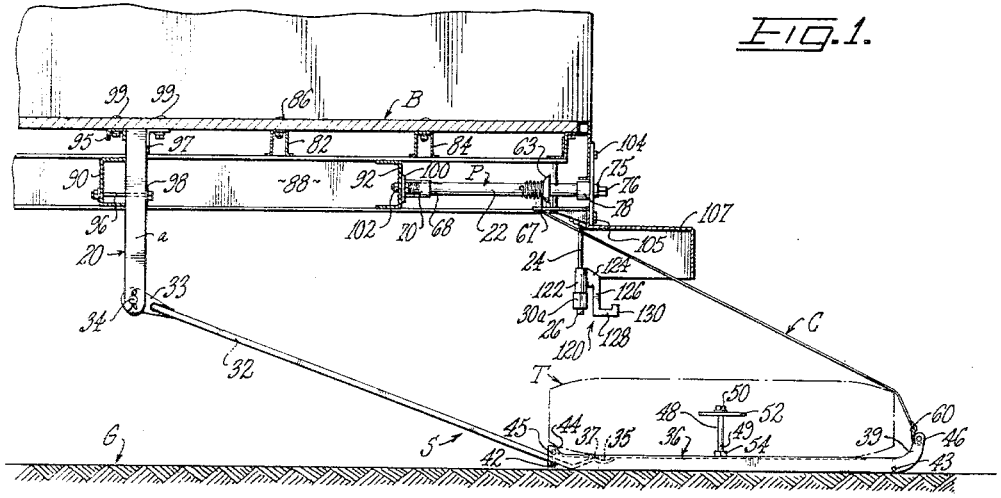
FIGURE 1 is a side elevational view of a spare wheel-mounted tire (in phantom) supported on the slide carrier which is resting on the ground in load-unload position, partially projecting from underneath a truck type of vehicle, of which only the lower rear fragment of the latter is shown partly in vertical section and partly in elevation.
Figure 2:
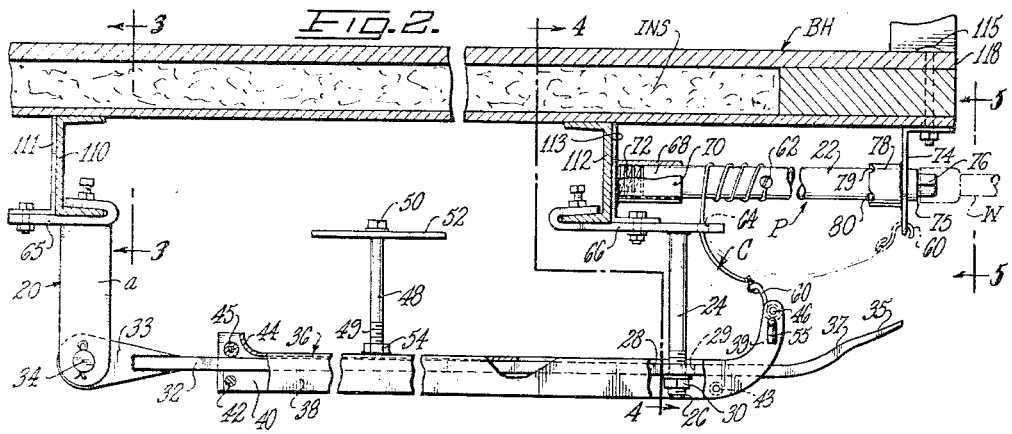
FIGURE 2 is a similar vertical section and elevation through the rear undercarriage of a highway trailer, showing the slide carrier (without the spare wheel and tire) locked in elevated or traveling position.
Figures 3, 4, 5, 13:
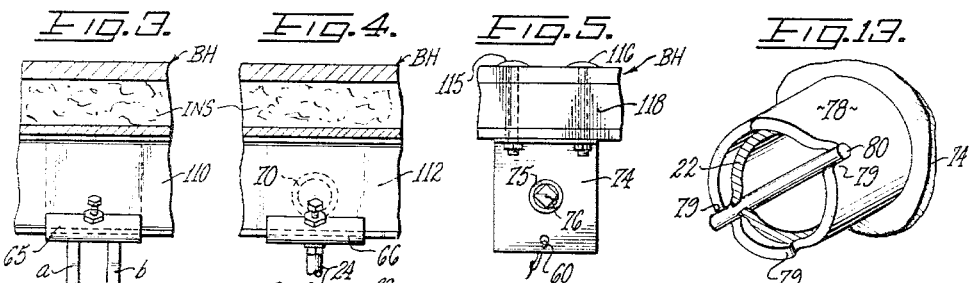
FIGURES 3, 4 and 5 are transverse vertical views taken along the corresponding lines of FIGURE 2 and particularly showing details of the attachment of the carrier assembly to the undercarriage.
FIGURE 13 is a fragmental perspective showing the transverse ratchet pin of the longitudinally displaceable pulley shaft, in engagement with an opposing pair of teeth of the ratchet collar.

Essentially my assembly embraces (I) a sturdy, downward projecting, generally vertical or upright member 20 dependently anchored beneath the undercarriage or chassis of the vehicle; such member can consist solely of an I-beam or similar, relatively narrow, rectangular structure, such as the parallel pair of upright arms *a* and *b*, or alternately it may be formed by a wider cross-wall member having a width corresponding more-or-less to the diameter of the tire T; (II) a two-piece, extensible unit providing an undersupport S for the tire, pivotally connected at its inner end to the bottom of the upright 20 for arcuate vertical movement beneath the chassis, and at its outer end, detachably hung or connected to a reeled cable C, which depends from a horizontally disposed, cylindrical pulley P around which the fixed end of the cable is wound. By reason of the location of the pulley assembly (III), adjacent the outer margin of the undercarriage, winding or unwinding the cable by rotation of the pulley shaft 22 serves both to raise and to retract the extended two-piece support unit (FIG. 1) to its storage or locking position (FIGS. 2 and 6). A locking element or mechanism (IV) is also provided for securely and easily fastening the raised support S in its "retracted" or "carried" position; this may be provided by a dependent stud 24 having a lower, threaded terminus 26 received through a corresponding opening 29 of the distal segment 28 of the support S, and there receiving a fastening element such as a nut 30 (FIG. 4); or alternately a locking construction such as shown in FIGURES 1, 6, 9, 10 and 12 may be used. After the undersupport S is dropped and simultaneously extended lengthwise to rest on the ground at its "load-unload" position, the cable C may then be manually attached and detached in order to make it more convenient to place and remove a tire from the support S. Generally these four components form an assembly which receives and delivers the spare wheel and tire from an elevated, stored position beneath the vehicle to the user at ground level adjacent the rear margin of the vehicle (that is, by movement lengthwise to the chassis); however they could be assembled to deliver the wheel (by lateral movement) to the side margin of the vehicle.

The two-piece support unit S consists of an elongated, lower rail 32 having its proximate end pivoted by the cross pin 34 to the lower end of the upright 20; plus a shorter, overlying, longitudinally slidable portion 36 formed with a similar pair of loosely embracing, lateral wings 38, 40 which are connected together at their respective ends by a cross pin 42 and roller 43 inserted loosely beneath the rail 32. The cross pin 42 thus serves also as an axis along which the outer length of the slide 36 can be progressively angularly disposed relative to the underlying rail 32 as when traveling to and from the "load-unload" position of FIGURE 1. An upper roller 45 serves to reduce friction during longitudinal movement of the slide 36 along the rail 32. In other words, the inner end of the slide 36 (which is loosely held to the rail 32 by the cross pin 42 and the channel-forming wings 38, 40), moves in and out between the extended pick-up position shown in FIGURE 1 wherein the entire length of the slide 36 rests directly on the ground or roadway G, and the retracted-elevated storage position adjacent the attachment head 33 of the (horizontal) rail 32 (FIG. 6).

Figures 12, 14:
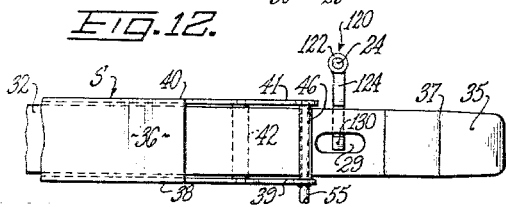
FIGURE 12 is a horizontal view of the outer end of the locked slide carrier taken along the line 12—12 of FIGURE 6.
FIGURE 14 is a fragmental longitudinal section, partly in elevation, of the coupled ends of the tire-support unit when fully extended.

Along its upper, generally planar face, the slide 36 has an inwardly terminal, upwardly bowed, rear abutment rim 44 located adjacent the edge or tread of a tire T supported thereon, while the outer end of the slide continues the side wings (38, 40) as upswept walls which jointly support a cross pin 46 to provide anchorage for the detachable cable hook 60 (FIGS. 9, 10, 12). The inner edges 39, 41 of the upswept walls may also serve as outer abutment means for a tire when the latter is placed atop the slide 36.

The outer or distal end 28 of the rail 32 is formed with an upslanted tongue 35 outwardly terminal to a transverse bend or corrugation 37. When the tongue 35 moves outward along the open-bottom channel of the slide 36 (by reason of the slide being moved to the left from its position in FIGURE 1), sliding contact of the upslanted tongue over top of the roller 43 then convergingly guides the length of the rail 32 upward so that it is received between the entire length of the wings 38, 40 and the rail 32 and slide 36 again become mutually parallel. When the slide 36 is drawn out lengthwise from the underlying rail 32 and slanted divergingly therefrom along the axis 42, 45 (by reason of the outer end of the rail 32 dropping to the ground, and also of the separating length of the slide 36 dropping to the ground), the inner end of the slide remains connected (at 42, 45, FIG. 1) and the rail 32 does not disengage from the channel (formed by wings 38, 40) due to the upslanted end 35, 37 providing stop or limit means in conjunction with the cross pin 42 and roller 45 when the rail 32 and slide 36 are thus angularly disposed. However when the rail and slide are moved together lengthwise, a loose sliding fit again ensues.

Centrally located midway along the length of the slide 36 is a vertical bolt or post 48, having its lower threaded end 49 received in a nut 54 which is welded atop the slide 36. The bolt head 50 serves to fasten a transverse hold-down bar 52 which is placed to span or overlie the central web 51 of a disk wheel or tire which may be centered around the removable bolt 48. If a spare tire alone is thus carried (i.e. not mounted on a wheel), the bolt-traversed, hold-down bar 52 should be long enough to span the inner diameter of the tire; alternately, of course, a wheel by itself can be bolted down. A laterally projecting grab-bar or hand-hold 55 (FIGS. 9–10) extends from the side wing 38 adjacent its outer end.

From a fixed attachment point 62 on the horizontal, pulley shaft 22, the cable C is wound around the shaft (in the trailer construction FIGURE 2) axially inward, and thence threaded through a guide hole 64 in the bracket 66 which supports the dependent stud 24. In the truck construction FIGURES 1 and 6, the cable C is wound outwardly along the pulley shaft 22 up to a flared abutment shield 63 and thence dropped through an eyelet bracket 67 (FIG. 9). In either event, the rotatable pulley shaft 22 is a generally cylindrical member mounted for limited axial displacement, with its inner end 68 journalled in a fixed, tubular collar 70, and held in end-abutment therein with a coiled compression spring 72. The outer end of the shaft is journalled in the plate 74 with an outward portion 75, extending therebeyond and from which a polygonal sided stem 76 projects. Such stem may be engaged by a tool such as a socket wrench or lug wrench W (FIG. 2) to effect manual rotation of the pulley. On the inner face of the bracket plate 74 is fixedly disposed a ratchet collar 78 (FIG. 13), the successive teeth 79 of which are disposed to register with a radially projecting ratchet pin 80 transversely inserted through the pulley. Thus the cable C can be readily wound on the pulley 22 upon rotating the latter by means of a suitable tool such as a socket wrench W applied to the stem 76. Upon the shaft 22 then being displaced axially inward, against the resistance of the coil 72 (by means of pressure on the projecting stem 76), the ratchet pin 80 is held disengaged from the teeth or sockets 79 of the ratchet collar 78, and the cable automatically unwinds, thus dropping the undersupport S to the ground as the slide 36 progressively moves outward along the length of the rail 32.

The precise manner of connecting the present assembly to the underface of a truck bed B (FIGURES 1 and 6) or house trailer BH (FIGURE 2) will of course depend upon the exact chassis structure which is initially present on the particular vehicle. In some instances, direct attachment may be effected to I-beams or analogous channel members already forming part of the undercarriage; in other cases, intermediate structure may need to be added. The truck bed B of FIGURE 6 has a series of transverse, inverted-U-shaped channels 82, 84 secured to the truck bed B by bolts 86 and dependently supporting a longitudinal channel member 88. The latter has a spaced pair of horizontally directed, cross channel irons 90, 92 welded to it in perpendicular projection. The upright wall of the inner cross channel 90 is traversed by a bolt 96 having a flanged head 98 which overlies the two arms a, b of the upright member 20.

At its upper extremity adjacent the underface of the body B, the upright 20 may be secured between fore and aft brackets 95, 97 which are anchored by floor bolts 99. Alternatively, a U-shaped clip 91 (FIG. 11) may outwardly embrace the cross channel 90 and bear on each free end a washer-like flange 93 and nut 94 overlying the upright 20 so as to secure it beneath the truck body B. Toward the outer margin of the vehicle, a cross plate 100, bolted at 102, 103 (FIG. 8) to the channel iron 92, is welded to the collar 70. Distally therefrom, the pulley stem 76 projects from the outer end of the shaft 22 beyond the mounting plate 74a which may be secured by bolts 104, 105 to the riser wall 106 adjacent the rear truck step 107.

In the house trailer of FIGURE 2, attachment is effected by utilizing a pair of cross channel members 110, 112 which are usually present as part of the chassis or supports for the body BH. In contrast to a truck, the house trailer floor BH may be multilayer or sandwich construction, including an intermediate layer of insulation INS. A corresponding pair of L-shaped angle irons 111, 113, are affixed back-to-back with the cross channels, and their lower edges are fastened together by respective transverse clamp jaws or brackets 65, 66, bolted or riveted thereto. The rear bracket plate 74 is attached by bolts or rivets 115, 116 (FIG. 6) or the like which are anchored in the flooring BH so as to dispose the pulley stem 76 somewhat inward from, or not projecting beyond, the plane of the end wall 118. That is, the release stem 76 preferably should not project beyond the vehicle body in such a manner that in backing the vehicle, the stem 76 would be pressed against an adjacent wall or obstacle to thereby trigger the release of the undersupport S.

Even so, such unintended dropping of the undersupport S would not occur as long as the nut 30 was retained on the shaft end 26. However, a further locking arrangement which guards against such contingency is shown mounted on the truck body—FIGURES 1, 6, 9, 10 and 12. There is provided a hanger 120 having an integral, lateral collar 122 by which it is vertically slidable and horizontally rotatable about the dependent stud 24. A generally radial, shoulder portion 124 supports a vertically descending strut 126 which is thus laterally offset from the stud 24, and at its lower extremity the strut supports a cross arm 128 having a terminal, upward-projecting tongue 130 (FIG. 10).

Accordingly, when the undersupport S is raised and the slide member 36 is pushed inward along the rail 32 by the upwinding cable C sufficiently to expose the distal end 28, the hanger 120 is then rotated horizontally about the stud 24 until its tongue 130 is in line with the slot 29 (FIG. 12). The nut 30a can then be tightened up to the desired height or horizontal level until a little slack develops in the cable C; the distal end of the support S is then gravitationally resting upon the hanger cross-arm 128 (with the tongue 130 received in the slot 29), which simultaneously holds the collar 122 against the nut 30a so as to keep the latter from turning or unloosening. Should the nut still be sheared off or otherwise become disconnected, the support unit S is of course still held up by the cable C until released by axial displacement of the pulley shaft 22 effected by inward movement of the stem 76 against the force of the spring 72.

It will be obvious to those skilled in the art that various changes of construction and operation may be made within the spirit and scope of the invention, and therefore this disclosure is not intended to be limited by the precise details shown in the drawings or particularly described in the specification by way of example, but due regard should be given to the possible substitution of known equivalents.

I claim:

1. A carrier assembly of the character described, adapted to selectively retain and to deliver from beneath a vehicle body and the like to a pick-up position beyond the periphery of said body, a spare tire and/or vehicle wheel in generally horizontal position, and comprising in combination: a dependent, generally horizontally disposable, support unit having an elongated portion terminally pivoted at its inner end for arcuate vertical movement of its length so as to dispose its outer end toward and away from the ground, and a slidable portion extending along said elongated portion and having its inner end hingedly connected to said elongated portion and also longitudinally slidable therealong, without terminal separation, whereby upon longitudinal extension it may project beyond the periphery of said vehicle body substantially parallel to the ground, said slidable portion carrying clamp means for holding a wheel after the latter is placed flat thereupon, the elongated portion having its inner pivoted end coupled to bracket means for dependent attachment beneath said vehicle body, whereby the outer end of the said support unit may be raised and lowered generally vertically toward and away from the body, and the slidable portion is extensible lengthwise therealong to project beyond the outer margin of said undercarriage from whence said tire and/or wheel may be placed thereon and lifted off; and operative means carried by said vehicle body and adapted to move the support unit between lowered-projected and elevated-retracted positions.

2. A carrier assembly of the character described, adapted to selectively retain and to deliver from beneath a vehicle body and the like to a pick-up position beyond the periphery of said body, a spare tire and/or vehicle wheel in generally horizontal position, and comprising in combination: a dependent, generally horizontally disposable, support unit having an elongated portion terminally pivoted at its inner end for arcuate vertical movement of its length so as to dispose its outer end toward and away from the ground, and a slidable portion extending along said elongated portion and having its inner end hingedly connected to said elongated portion and also longitudinally slidable therealong, without terminal separation, whereby upon longitudinal extension it may project beyond the periphery of said vehicle body substantially parallel to the ground, said slidable portion carrying clamp means for holding a wheel after the latter is placed flat thereupon, the elongated portion having its inner pivoted end coupled to bracket means for dependent attachment beneath said vehicle body, whereby the outer end of said support unit may be raised and lowered generally vertically toward and away from the body, and the slidable portion is extensible lengthwise therealong to project beyond the outer margin of said undercarriage from whence said tire and/or wheel may be placed thereon and lifted off; pulley means secured to said vehicle body in approximate vertical alignment with the outer end of said lower portion and adapted to raise and lower the same, between extended and retracted positions; and lock means adapted to secure both portions in elevated-retracted position when supporting a spare tire and/or wheel thereon.

3. The assembly of the preceding claim 2 wherein said pulley means comprise a generally horizontal, rotatable shaft about which an attachment cable is wound, said shaft being manually engageable for rotation in one direction, as by a hand lever, from the outer margin of said vehicle, which pulley shaft is longitudinally displaceable and provided with peripheral ratchet means disposed normally to limit its engaged rotation to said one direction, and axially directed, resilient means adapted normally to maintain said shaft in engagement with said ratchet means, thus to enable raising said support member by progressively winding the cable about the shaft, and upon longitudinal displacement of the shaft from ratchet engagement by reason of temporarily overcoming said resilient means, permitting unwinding of said cable and lowering of said support.

4. The assembly of the preceding claim 2 wherein said lock means include a dependent stud adapted to receive an axially adjustable retaining element on its lower end, and a hanger member rotationally and axially movable about said stud above the retaining element and adapted selectively to hold the support member from beneath when the latter is in elevated position and thereby to frictionally lock the retaining element against removal.

5. In combination with a vehicle body: an elongated rail spaced beneath said vehicle body and having its inner end pivotally secured thereto in position to permit its outer end to drop angularly to the ground adjacent the periphery of said vehicle; lift and fastening means carried by the vehicle body and adapted selectively to raise said outer end of the rail from the ground and to secure it spaced generally horizontally beneath the vehicle body and above the ground; an elongated slide having means for supporting a spare tire and/or vehicle wheel in a carried position sandwiched between the rail and the vehicle body, said slide having lateral wings along each side thereof forming an open-bottom channel loosely engaging said rail and slidable lengthwise therealong between a carried position wherein the entire length of the slide lies generally parallel alongside the rail and a generally horizontal, ground-level pick-up position wherein the slide extends beyond the periphery of said vehicle body and in terminal engagement with the then-angularly disposed rail, whereby a spare tire and/or vehicle wheel may be placed and removed from said slide beyond the periphery of the vehicle body, and thence may be moved to and from said carried position adjacent the underface of said vehicle body by said lift means.

References Cited by the Examiner

UNITED STATES PATENTS 2,645,394  7/1953  De Bord _____ 214—454

FOREIGN PATENTS 824,144  12/1951  Germany.

HUGO SCHULZ, *Primary Examiner.*